United States Patent [19]
Frantom et al.

[11] Patent Number: 5,257,819
[45] Date of Patent: Nov. 2, 1993

[54] HYBRID INFLATOR

[75] Inventors: Richard L. Frantom, Richmond; Robert J. Bishop, Washington; Robert M. Kremer; Klaus F. Ocker, both of Fraser, all of Mich.; Charles D. Woods, Gainesville, Ga.; Donald W. Renfroe, Haymarket, Va.; James M. Rose, Fairfax, Va.; Teresa L. Bazel, Annadale, Va.; Roy Brown, Hot Springs, Ark.

[73] Assignee: Bendix Atlantic Inflator Company, Sterling Heights, Mich.

[21] Appl. No.: 985,511

[22] Filed: Dec. 2, 1992

Related U.S. Application Data

[63] Continuation of Ser. No. 808,781, Dec. 17, 1991, abandoned, which is a continuation-in-part of Ser. No. 618,428, Nov. 27, 1990, Pat. No. 5,076,607.

[51] Int. Cl.$^5$ .............................................. B60R 21/26
[52] U.S. Cl. ........................................ 280/737; 222/5; 137/68.2
[58] Field of Search .................... 222/5; 280/737, 736, 280/741, 728; 137/68.2; 102/530, 531; 422/164, 165, 166

[56] References Cited

U.S. PATENT DOCUMENTS

| | | | |
|---|---|---|---|
| 1,781,027 | 11/1930 | Mapes | 222/5 |
| 2,209,956 | 8/1940 | Chase et al. | 222/5 |
| 3,663,036 | 5/1972 | Johnson | 222/5 |
| 3,690,695 | 9/1972 | Jones | 102/531 |
| 3,741,580 | 6/1973 | Vos | 280/735 |
| 3,773,353 | 11/1973 | Trowbridge et al. | 280/737 |
| 3,774,807 | 11/1973 | Keathley et al. | 222/3 |
| 3,895,821 | 7/1975 | Schotthoefer et al. | 222/5 |
| 3,948,540 | 4/1976 | Meacham | 280/735 |
| 3,968,980 | 7/1976 | Hay | 222/5 |
| 3,972,545 | 8/1976 | Kirchoff et al. | 280/735 |
| 4,006,919 | 2/1977 | Neuman | 280/736 |
| 4,007,685 | 2/1977 | Nimylowycz | 102/530 |
| 4,018,457 | 4/1977 | Marlow | 280/737 |
| 4,021,058 | 5/1977 | Suzuki et al. | 280/737 |
| 4,136,894 | 1/1979 | Ono et al. | 280/740 |
| 4,203,616 | 5/1980 | Okada | 280/737 |
| 4,358,998 | 11/1982 | Schneiter et al. | 280/741 |
| 5,022,674 | 6/1991 | Frantom et al. | 280/737 |
| 5,076,607 | 12/1991 | Woods et al. | 280/737 |

Primary Examiner—Karin L. Tyson
Attorney, Agent, or Firm—Markell Seitzman

[57] ABSTRACT

An inflator (110) including: a pressure means (12, 14, 16, 20) for storing a quantity of stored inflation gas under pressure. The pressure means including a first burst disk (46) in communication with the stored inflation gas and preventing egress of the gas from the chamber and a hollow sliding piston (172) having at one end thereof cutting edges (174) for puncturing the first burst disk (46). A shear disk (180) having a stationary outer portion (187) and a central portion or second disk (186), central portion is secured to one end of the piston (172) opposite the cutting edges (174). The central portion is capable of separating from the outer portion and moving with the piston (172). A quantity of propellant material (218) is provided near the second burst disk (80) to produce gaseous combustion products when burned. The piston is propelled into the first burst disk (46) after the central portion (186) of the shear disk separates from the outer portion in response to the build up of pressure generated due to the burning of a propellant (218), thereby permitting the egress of the stored inflation gas. The central portion (186) or second burst disk is ruptured by the continued build up of pressure due to the burning propellant material whereupon after the rupturing of the second burst disk the heated products of combustion resulting from the burning propellant material flow through the sliding piston (172).

18 Claims, 4 Drawing Sheets

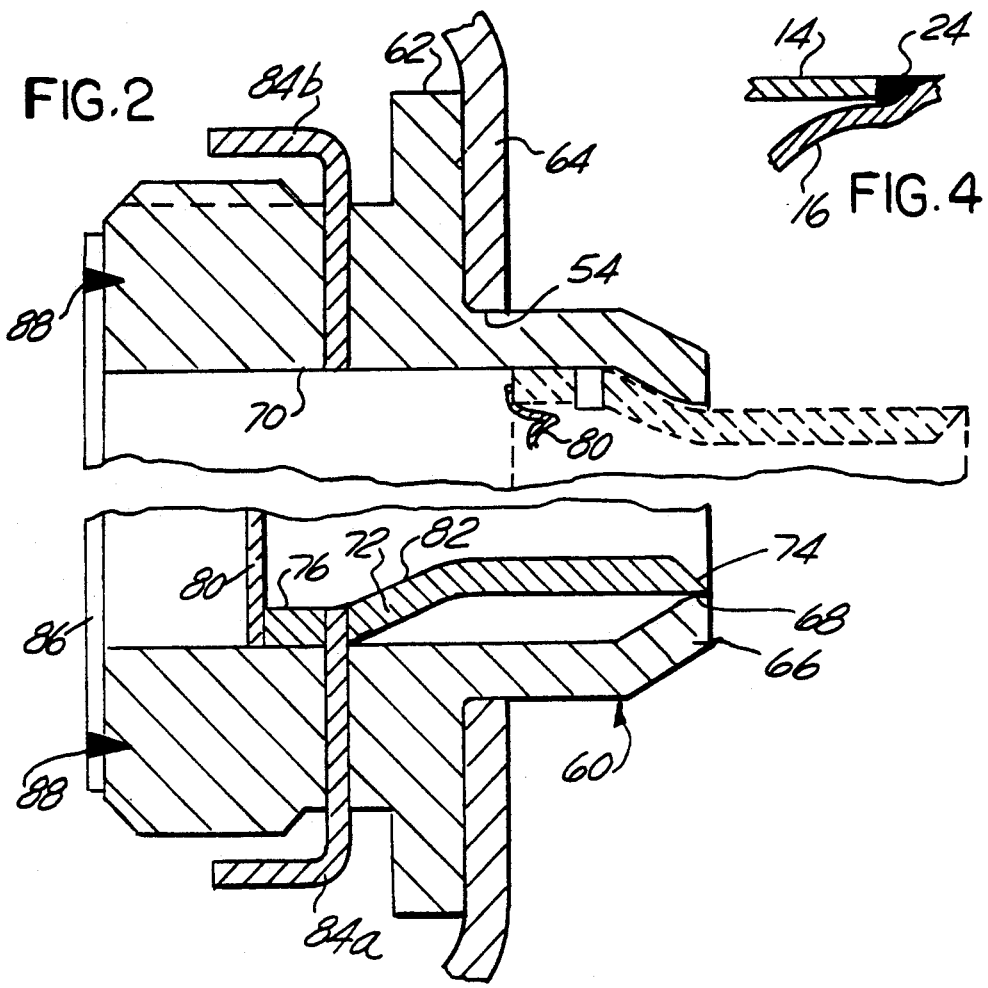
FIG.2
FIG.4
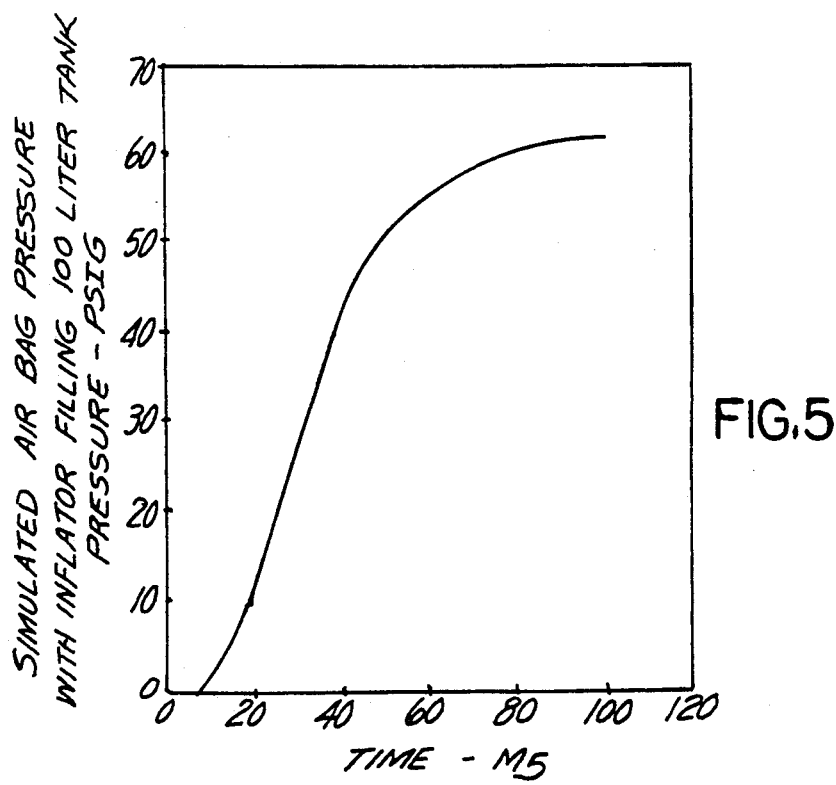
FIG.5

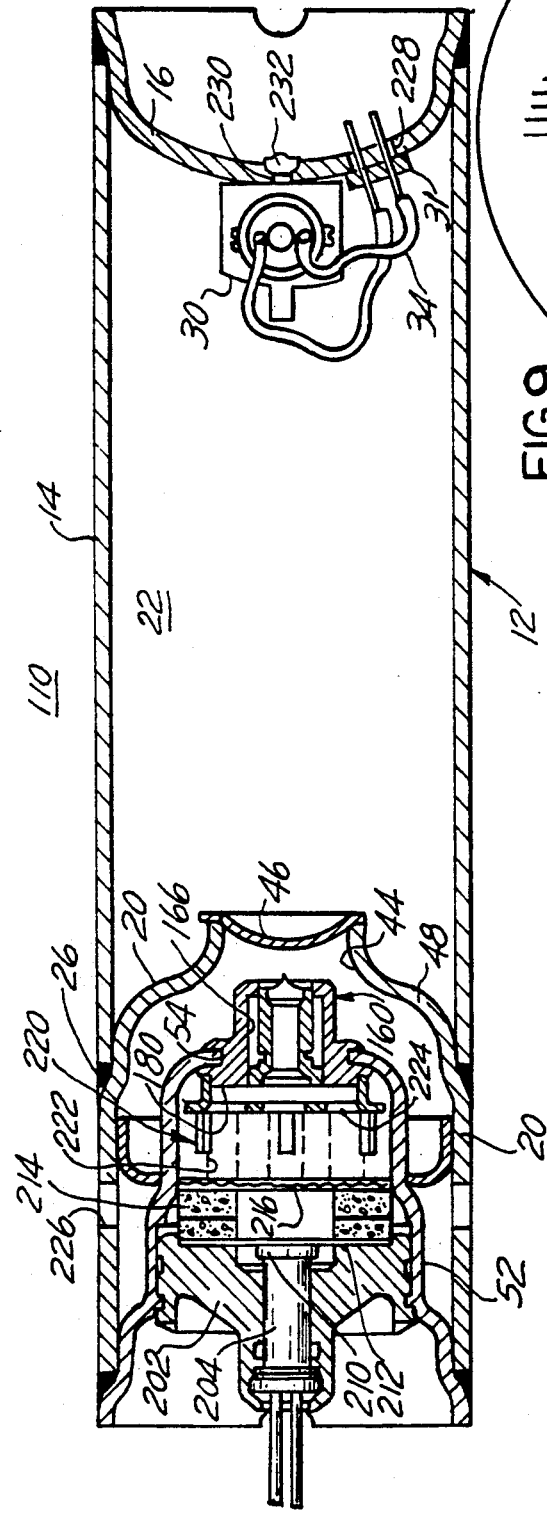
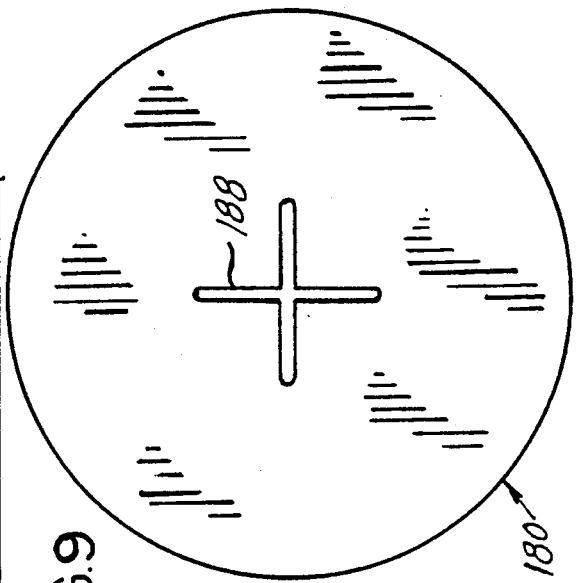
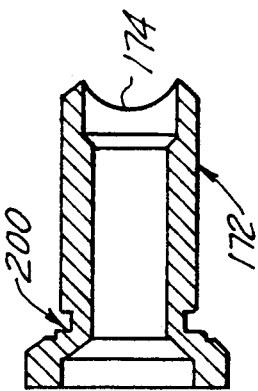
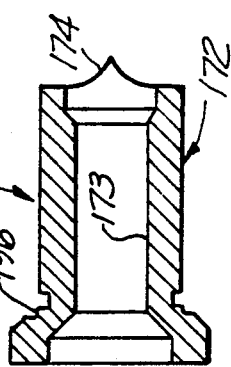
FIG. 6
FIG. 9
FIG. 11
FIG. 12

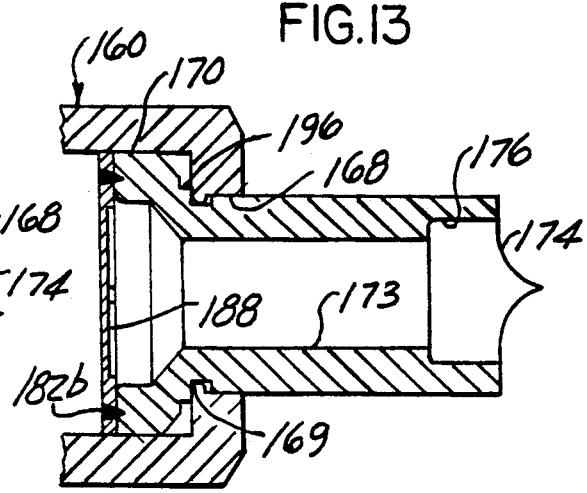
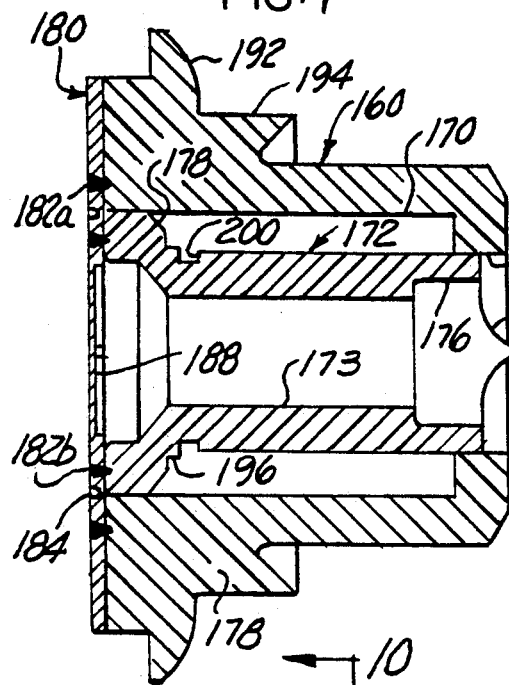
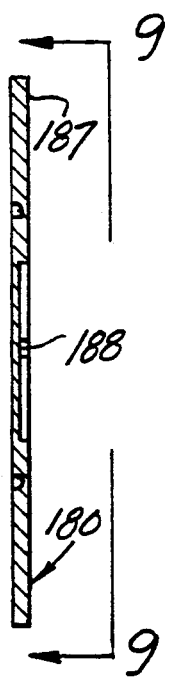
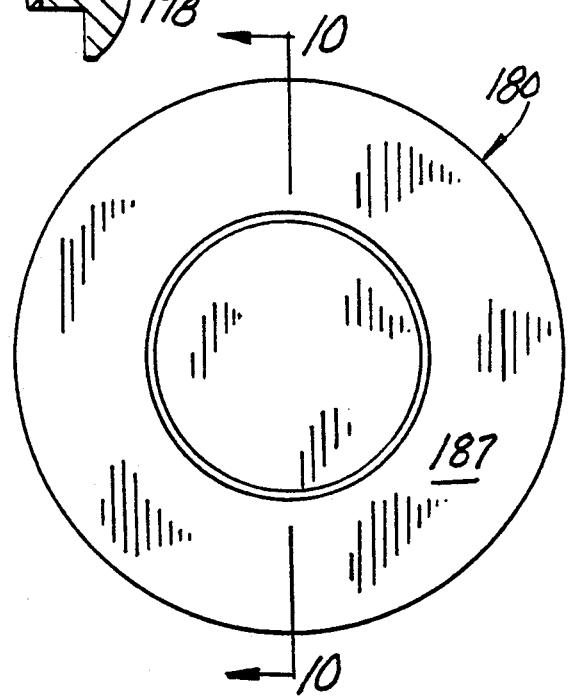

HYBRID INFLATOR

This application is a continuation of application Ser. No. 07/808,781, filed Dec. 17, 1991 now abandoned, which is a Continuation-in-Part of Ser. No. 07/618,428, filed Nov. 27, 1990, now U.S. Pat. No. 5,076,607.

BACKGROUND AND SUMMARY THE INVENTION

The present invention generally relates to an inflator for an air bag or cushion and more specifically to the type of inflator known as a hybrid inflator.

It is known that if the early inflation rate of an air bag is too high, the resulting deployment forces can contribute to the possible injury of an occupant who is out of the normal seated (either driver or passenger) position. If, however, the air bag inflation rate is maintained at a relatively low value, primarily to reduce such deployment forces, full deployment of the air bag may not be timely achieved.

It has for some time been appreciated that one goal of air bag inflator design is to provide an inflator which initially has a relatively low or soft inflation rate (for a relatively few milliseconds) primarily to protect the out-of-position passenger, such as a standing child, who would be subject to large deployment forces and thereafter to rapidly increase the inflation rate of the air bag to cause rapid and full inflation. The prior art shows techniques for achieving this staged (bi-level) inflation of an air bag by utilizing an inflator which is capable of producing inflation bases with at least a low and a higher rate of gas production. With regard to air bag inflators generally, whether they are of the hybrid or stored gas variety or of the solid propellant (typically sodium azide) variety is the inclusion of an initiator or squib and a mass of gas producing or propellant material. As is known in the art and in response to a crash signal, the squib (or initiator) is activated which in turn causes the propellant material to burn. In the case of a hybrid inflator the purpose of the propellant material is to heat the stored inflation gas thereby increasing the effective, released volume of same while also increasing the rate of egress of the inflation gases from a pressure tank. In this case heated, stored gas is the primary source of inflation gases. In the solid propellant type of inflator, the squib causes the propellant to burn, the purpose of which is to generate a relatively inert, large volume of inflation gases.

In order to achieve the above-mentioned staged, variable inflation rate for an inflator, the prior art has proposed using a plurality of detonating devices to sequentially open restricted and unrestricted flow paths (see U.S. Pat. No. 3,741,580). Another type of device for generating the staged inflation has been proposed in U.S. Pat. No. 3,774,807, wherein upon activation of a single detonating element a piston moves to uncover a flow passage permitting the cold egress of stored gas from a pressure tank, thereafter the piston is used to detonate a quantity of propellant which in turn heats the stored gases prior to exiting the inflator. Instead of selectively opening a flow port as described above, U.S. Pat. No. 3,948,540 shows the technique of using a spear thrower mechanism which punctures a sheer disk to permit stored gas to flow through various exit ports and inflate the air bag. Still another technique to provide the staged inflation is to use a dual electro explosive device system wherein one detonator is used to rupture a disk which initially permits the stored gas to flow into the air bag and shortly thereafter to energize the second initiator which causes the propellant to burn and as such increases the rate at which gases exit the inflator. Of the patents illustrative of inflators using two or more electro explosive elements are U.S. Pat. Nos. 3,972,545; 4,007,685; 4,136,894; and 4,358,998. Additional patents which utilize variable orifice devices are U.S. Pat. Nos. 4,006,919; 4,018,457; 4,021,058; 4,203,616; 4,268,065 and 4,619,285. Other devices utilizing sliding members or disk piercing mechanisms are: U.S. Pat. Nos. 3,910,596; 3,948,540; 3,966,226; and 4,771,914.

It is an object of the present invention to provide an inflator for providing gases to inflate an air bag having a single electrically responsive squib and one primary quantity of propellant material in order to achieve a dual or staged inflation rate of the air bag.

Accordingly the invention comprises: an inflator (110) comprising: a pressure tank for storing a quantity of stored inflation gas under pressure. The pressure tank comprising a first burst disk in communication with the stored inflation gas preventing egress of the gas from the chamber and a hollow sliding piston and including at one end thereof cutting edges for puncturing the first burst disk as the piston is thrust forward. A shear disk having a stationary outer portion and a detachable central or inner portion. The central portion is secured to one end of the piston opposite the first means. The central portion separates from the outer portion and moves with the piston. The central portion also functions as a second burst disk. A quantity of propellant material is provided near the second burst disk and produces gaseous combustion products when burned. The piston is propelled into the first burst disk after the central portion of the shear disk separates from the outer portion in response to the build up of pressure generated due to the burning of a propellant. The puncturing of the first burst disk permits the egress of the stored inflation gas. The central Portion or second burst disk which is still attached to the piston is ruptured by the continued build up of pressure due to the burning propellant material whereupon after the rupturing of the second burst disk the heated products of combustion resulting from the burning propellant material flow through the sliding piston to increase the temperature of the stored inflation gas prior to its exit from the inflator.

Many other objects and purposes of the invention will be clear from the following detailed description of the drawings.

BRIEF DESCRIPTION OF THE DRAWINGS

In the drawings:

FIG. 2 illustrates an exploded view of a portion of FIG. 1.

FIG. 3 illustrates an alternate embodiment of the invention.

FIG. 4 illustrates an exploded view of a portion of FIG. 1.

FIG. 5 illustrates pressure-time profiles.

FIG. 6 illustrates an alternate embodiment of the hybrid inflator.

FIG. 7 illustrates an isolated view of a sleeve and piston.

FIGS. 8 thru 10 illustrate various views of a rupture disk.

FIGS. 11 and 12 illustrate various views of the piston.

FIG. 13 illustrates the piston is its forward position.

DETAILED DESCRIPTION OF THE DRAWINGS

Figure 1:
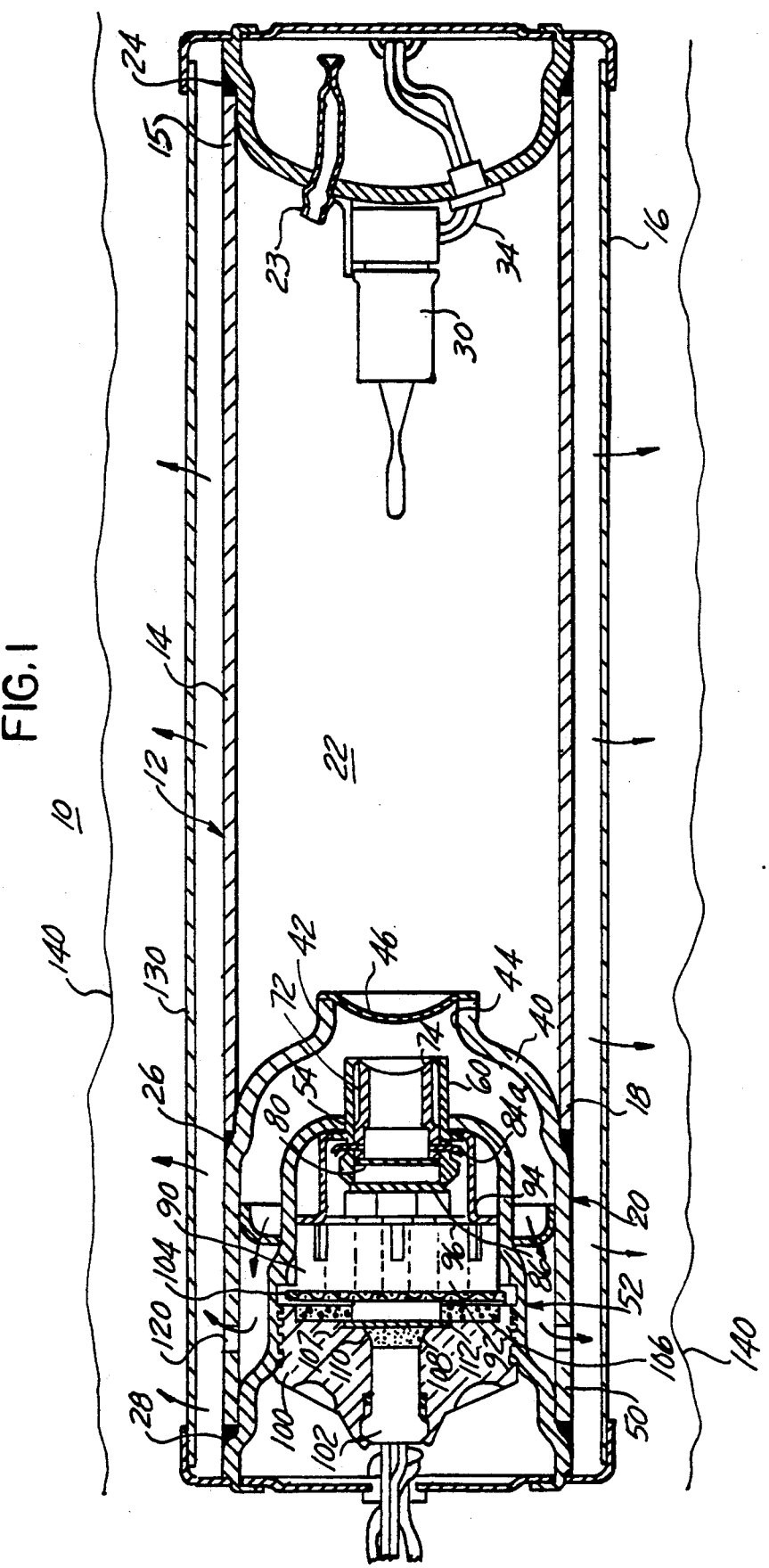
FIG. 1 illustrates a cross-sectional view of the present invention.

With reference to FIG. 1 there is shown a hybrid inflator 10 for inflating an air cushion such as an air bag usable within a vehicle occupant safety restraint system. The inflator 10 comprises a pressure tank generally shown as 12. The pressure tank comprises three portions including a hollow cylindrical sleeve 14 secured at one end 15 to a first end cap 16. The sleeve is also secured at end 18 to another cylindrically shaped end cap 20. The pressurized tank 12, in the space shown as 22, is filled and pressurized with an inert gas such as Argon. This gas may be inserted and sealed within the pressure tank through a fill tube 23 of known design. The pressurized gas may also be a mixture of Argon and another inert gas such as helium. Typically the amount of helium is approximately two percent (2%) by volume of the amount of Argon gas. The purpose of using helium is to provide a means for detecting defects in any of the various weld joints such as 24, 26 or 28. FIG. 4 illustrates a typical weld joint 24. It can be seen that the sleeve 14 is spaced from the end cap 16 to permit the unrestricted migration of the stored gas to the weld joint so that any defects in such joint can be immediately identified during the initial pressurization of the pressure tank 12. The test measures the presence of helium external of the inflator as known in the art.

An optional pressure sensor 30 may be secured to end cap 16. A seal such as a glass to metal seal is provided to seal an opening in the end cap 16 through which wires 34 associated with the pressure sensor are fed through. The end cap 20 includes a necked-down portion 40 facing the interior 22 of the pressure vessel. The end 42 of the end cap 20 is provided with an opening 44 which is closed by a rupturable, thin disk 46, preferably made of stainless steel, inconel or nickel. Secured to an end 50 of the end cap 20 is a gas generator housing generally shown as 52. The housing 52 extends partially within the end cap 20.

Positioned within an opening 54 within the housing 52 is a sleeve 60 which includes a flange 62 adjacent the forward portion 64 of the housing 52 (see FIG. 2). The sleeve 60 includes a narrow mouth portion 66 proximate an opening 68. Positioned within the bore 70 formed within the sleeve 60 is a sliding piston generally shown as 72. As can be seen from the drawings, the piston 72 is hollow and includes at a forward end thereof a cutting edge 74. Positioned at the rear end 76 of the piston 72 is another burst disk 80 of similar construction to burst disk 46. The burst disk 80 encloses the hollow bore or opening 82 defined by the walls of the piston 72. The sliding piston 72 is initially retained within the sleeve 60 by shear pins 84a and 84b. An alternate embodiment of the piston 72 having a pointed cutting edge 74' is shown in FIG. 3. In addition, FIG. 3 shows the burst disk 80 being formed as an integral part of the piston 72. An annular groove 78 may be formed on the rear face of the disk 80 to selectively weaken same.

The rear of the sleeve 60 may be partially covered by a restraining strap 86 which may be secured such as by welding at locations 88 to the sleeve 60. This restraining strap may be a thin, narrow band or alternatively, a wire. The purpose of the restraining strap 86 will be clear from the description below. If a band is used, it is contemplated that it could be fabricated of stainless steel having a thickness of 0.050 inches (1.27 mm) and a width of approximately 0.125 inches (3.175 mm).

Positioned within the housing 52, and rearward of the sleeve 60, is a quantity of propellant material 90 (see FIG. 1) such as Arcite disclosed in U.S. Pat. Nos. 3,723,205 or 4,981,534, which are incorporated herein by reference. As is known in the art, Arcite can be extruded to a shape conformal with the housing 52. Similarly, as known in the art, the molded propellant 90 may include a plurality of axially extending passages such as 92 to control the burn rate of the propellant material 90. The propellant 90 is supported within the propellant housing 52 by a metal retainer 94 having a plurality of openings such as 96 coaxial with the openings 92 formed in the propellant 90.

An initiator housing 100 is secured to the propellant housing 52. Inserted within the initiator housing is an initiator or squib 102 of known variety which ignites in response to an electric control signal indicative of a crash situation. Squibs or initiators 102 or the like are well known in the art and are not described further herein.

Situated upstream of the ignitor 102 and within a small cavity 108 formed in the initiator housing 100 is a small quantity of ignition enhancing material 110 which may primarily consist of boron potassium nitrate. This ignition enhancing material may be sealed within the housing 100 by encapturing same by a thin metal foil layer 112.

Upon securement of the initiator housing 100 into the propellant housing 52, the propellant 90 is biased inwardly by action of a screen 104 which acts to uniformly distribute the heat, generated upon activation of the initiator 102, to the propellant 90. A sponge or spring element 106, preferably fabricated of a silicone sponge material, provides a modest preload on the propellant to maintain same in place. The resilient sponge element 106 includes an opening 107 so as not to interact with the flame produced by the squib 102.

The operation of the inflator 10 is as follows. The pressure tank 12 is initially filled to a Pressure of between 2,000 and 4,000 psi with Argon/helium inflation gas, however, it has been found that an inflation pressure of approximately 3,000 psi is normal for the purpose of inflating many air bags. In this condition the burst disk 46 prevents egress of the inflation gases. In response to a signal indicative of a crash situation, the initiator 102 ignites thereby igniting the enhancing material 110 causing the propellant 90 to burn. As the propellant 90 burns, pressure is built up within the propellant housing 52 and acts on the rupture disk 80 secured to the sliding piston 72. This pressure which operates against the surface area of the burst disk 80 will build to a sufficient magnitude to create a force adequate to shear the shear pins 84a and b causing the sliding piston 72 to move within the sleeve 60 and puncture the burst disk 46. Upon puncturing the burst disk 46, the stored inflation gas immediately exits the orifice openings 120 in the end cap 20 and flows into a manifold 130 to inflate the air bag 140 which would typically be secured about the manifold in a known manner.

As can be appreciated, at this point in time the hot products of combustion resulting from the burning propellant have not yet mixed with the stored inflation gas and as such the puncturing of the burst disk 46 by the sliding piston 72 results in an initial, cold gas, gentle (low rate) deployment of the air bag as can be seen in the initial portions of the inflation time history as shown in FIG. 5. The pressure within the propellant housing 52 continues to rise as a result of the burning propellant 90 until a predetermined rupture pressure of the burst disk 80 is achieved. Typically this pressure could be approximately 5,000 psi. Subsequently, the hot gases generated by the propellant 90 are injected into the pressure tank 12 via the central bore 82 of the sliding piston 72. The injection of the hot propellant gases causes the gases exiting the orifice openings 120 in the end portion 40 of the pressure tank 12 to be heated, resulting in an increased rate of inflation of the air bag. This increased rate of inflation is also shown in FIG. 5. Reference is again made to FIG. 2, which shows the initial position of the piston 72 and also shows the stroked position of this piston (in phantom line). As previously mentioned, the sleeve 60 includes a narrowed portion 66 which upon movement of the piston 72 causes an interference fit with the piston 72 which serves to maintain the piston in its stroked position after it has opened the rupture disk 80. The restraining strap 86 (also shown in FIG. 2) provides a retainment for the sliding piston 72 in the event that it should stroke in reverse direction after first being exposed to the pressure of the stored Argon gas upon rupture of the burst disk 46.

As can be seen from the above, the present invention provides a methodology for providing the staged deployment of an air bag by selectively choosing the rupture pressure of the burst disk 80. The significance of this is that the inflator 10 provides for the slow, early onset of air bag deployment which results in lower air bag deployment forces which is significant in relation to out-of-position occupants. In addition, any deployment doors used to enclose the air bag, in its stored condition, would also be subjected to these lower deployment forces when they are opened, thereby providing for a more controlled opening of the deployment door. In addition, with regard to small vehicles which may be characterized by a severe crash pulse signature requiring the more rapid deployment of the air bag, it can be seen that the rupture pressure of the burst disk 80 which permits the communication of the heated propellant gases with the stored Argon gas can be chosen so that the time between the initial soft inflation of the air bag and the more rapid inflation of the air bag due to the communication of the heated propellant gases with the stored Argon gas occurs relatively shortly thereafter.

Reference is now made to FIG. 6 which illustrates an alternative hybrid inflator 110. As will be appreciated from the description below, this hybrid inflator shares many common components with hybrid inflator 10 described above. The hybrid inflator 110 includes the pressure vessel 12 comprising cylindrical sleeve 14 enclosed by end caps 16 and 20. End cap 20 includes the necked down portion 40 defining opening 44 which is sealed by a rupture disk 46. Positioned within the inflator 110 apart from the Argon gas generally shown as 22, is a gas generator housing 52 defining an opening 54. Positioned within the opening 54 of the gas generator housing 52 is a sleeve 160 similar in function to sleeve 60 illustrated in FIG. 1. The sleeve 160 includes a stepped bore 170 (see FIG. 7) terminating at opening 168. Positioned within the bore 170 is is a hollow sliding piston 172. The piston 172 includes a cutting edge 174 which as described below penetrates the burst disk 46. The cutting edge 174 comprises two sharp points that taper to the full diameter of the piston. These points concentrate the available energy, creating localized stresses on the burst disk 46, and minimize the generator pressure required to drive the piston 172 through the burst disk 46. This action enhances the quick release of Argon gas 22. The face of the piston 172 is counter-bored at 176 so that standard inventory parts can be specially reamed to an appropriate up front diameter without disturbing the points. Under normal ambient temperature conditions, it can be appreciated that the diameter of bore 173 can effectively control the pressure in the gas generator which correspondingly controls the burn rate of the propellant. The control of the burn rate is effective in tailoring the rate of inflation of the air bag to the specific needs of the vehicle. The piston 172 also includes a central bore 173. The left end 178 or head of the piston 172 is slidingly received within the stepped bore 170. In the position as shown in FIG. 6, the piston 172 is initially retained to the sleeve 160 by use of a shear disk 180. The shear disk may be laser welded to the sleeve at circular weld joints shown as 182a and 182b. An end view of the shear disk 180 is shown in FIG. 8. The shear disk 180 includes a circular stress riser groove 184 which provides for the controlled separation of a central portion 186 of the disk from its outer portions 187 which faces the piston 172. The shear disk 180 also includes a second stress riser 188 as well as the diameter of the central portion 186 comprising intersecting grooves, which in the preferred embodiment takes the shape of an X or T (see FIG. 9). This stress riser 188 determines the pressure at which the central portion 186 of the shear disk 180 will rupture due to the build-up of pressure on the face 189. A cross-sectional view of the shear disk 180 is shown in FIG. 10.

Reference is again made to FIG. 7 and in particular to the sleeve 160. As can be seen, the outer surface of the sleeve 160 is stepped. The sleeve includes an outer, arcuately shaped flange 192 having a shape that is generally conformal with the inner wall of the gas generator housing 52 proximate the central opening 54. The sleeve 160 also includes a second flange 194. In FIG. 7 the flange 192 is shown in its pre-assembled condition. During assembly, the sleeve 160 with the rupture disk 180 and piston 172 are slid within opening 54 of the gas generator housing 52. Thereafter, the flange 194 is bent outwardly resulting to the configuration shown in FIG. 6, thereby securing the sleeve 160 to the gas generator housing 52. This bending of flange 194 can be accomplished by a ring crimping technique which allows the flange 194 to be rolled over the wall of the generator housing.

Reference is made to FIGS. 11 and 12 which illustrate various views of the piston 172 and more clearly show the cutting edges 174 formed thereon. As can be seen from FIG. 12 as well as FIG. 7, the piston includes a stepped annulus 196 the diameter of which is slightly larger than the diameter of the elongated portion 198 of the piston 172. The diameter of the annulus 196 is also slightly larger than the diameter of the opening 168 of the sleeve 160. The piston 172 also includes an annular groove 200. The purpose of the groove 200 and annulus 196 will be discussed below.

Reference is again made to FIG. 6. As can be seen, the left hand portion of hybrid inflator 110 includes structure similar to the hybrid inflator 10 shown in FIG. 1. More specifically, the inflator 110 includes an initiator housing 202, a squib 204 secured therein, a small quantity of ignition enhancing material 210 such as boron potassium nitrate, which is sealed to the housing 202 by a thin metal foil layer 212. Situated to the right of the initiator housing 202 is a sponge or spring element 214 and a screen 216 which provide the same function as spring element 106 and screen 104 of inflator 10. A quantity of molded or extruded propellant 218 is also placed within the gas generator housing 52 which is secured by the metal retainer 220. The propellant includes a plurality of axial passages 222 which are coaxial with openings 224 formed in the retainer 220. The ignition enhancing material 210 is designed to ignite at a lower temperature than the auto ignition temperature of the propellant 218. This feature assures that if the vehicle were involved in a fire or if the inflator itself were to burn, such as being placed in a disposal fire, that the propellant 218 is ignited at a low enough temperature that its burn rate and pressure generation is controlled through the piston nozzle, i.e., bore 173.

The operation of inflator 110 is similar to the operation of inflator 10. In response to a signal indicative of a crash situation, the initiator 204 ignites thereby igniting the material 210 causing the propellant 218 to burn. As the propellant 218 burns pressure is built up in the propellant housing 52 which acts on the shear disk 180. At a predetermined pressure, determined by the dimensions of the stress riser 184 the piston 172 and central portion 186 of the shear disk separates from the outer portion 187 of the shear disk 180. The central portion 186 remains attached to the piston 172. The piston 172 is propelled by the pressure into the burst disk 46 wherein the cutting edges 174 puncture the burst disk 46 permitting the stored Argon gas to flow through the now ruptured burst disk 46, between the end cap 20 and gas generator housing 52 and outwardly through openings 226 to begin to inflate the air bag.

Reference is briefly made to FIG. 13. As may be recalled from the description above, the diameter of the opening 168 is sized to be smaller than the annulus 196 formed on the piston 172. This difference in dimension will provide for an interference fit between the piston 172 and sleeve 160. As can be appreciated, as the piston 172 is thrust forwardly by the pressure exerted thereon which may be 5000 psi, the the larger drawer annulus 196 impacts the sleeve 160 proximate opening 168 to create the interference fit and stops or decelerates the piston thereby reducing the stresses on the piston head. It is believed that as the annulus impacts the sleeve 160, the sleeve is slightly deformed about the opening 168 to create a ridge or burr 169. As mentioned earlier, the piston 172 includes an annular groove 200. This annular groove 200 is positioned slightly to the right of the piston head 174 and annulus 196. In the forward or burst disk piercing position shown in FIG. 13, the groove 200 interferes with the burr 169 which is effective to prevent the piston from moving rearwardly thereby improving the retention of the piston in its stroked position.

Reference is again made to FIG. 6. The inflator 110 may also include the pressure sensor 30 which will generate a low pressure signal as an associated switch opens or closes if the pressure of the Argon gas 22 has reduced below a defined level. A seal 31 such as a glass to metal seal is provided to seal an opening 228 in the end cap 16 through which the wires 34 of the pressure sensor are fed through. The end cap also includes another opening 230 and seal 232, comprising a metal ball, which replaces the fill tube 23 of FIG. 1. In order to fill the pressure vessel 12 with Argon gas, the inflator 110 will be fit into a gas filling apparatus. More particularly, it is envisioned that the end cap 16 will be mated to this gas filling apparatus wherein pressurized Argon gas enters the pressure vessel 12 through opening 230. When a sufficient quantity of Argon gas has been inserted within the inflator 110, the filling apparatus will drop a metal ball into the end cap. With the pressure vessel 12 in a vertical position, the metal ball 232 will come to rest in the opening 230. Thereafter, an electrode associated with the filling apparatus will be moved into contact with the ball 232 and upon energization of the electrode, the ball 232 will be welded in place thereby sealing the inflator 110.

Many changes and modifications in the above described embodiment of the invention can, of course, be carried out without departing from the scope thereof. Accordingly, that scope is intended to be limited only by the scope of the appended claims.

What is claimed is:

1. An inflator comprising:

a pressure means for storing a quantity of stored inflation gas under pressure, the pressure means comprising a first burst disk in communication with the stored inflation gas and preventing egress of the gas from the chamber;

a hollow sliding piston having an opening and including at one end thereof first means for puncturing the first burst disk;

a shear disk having a stationary outer portion and a central or inner portion, the central portion secured to one end of the piston opposite the first means and the central portion capable of separating from the outer portion and moving with the piston, the central portion functioning as a second burst disk, the stationary outer section having a burst strength which is less than a burst strength of the central or inner portion;

a propellant material provided near the second burst disk, said propellant producing gaseous combustion products when burned;

the piston being propelled into the first burst disk after the central portion of the shear disk separates from the outer portion in response to the build up of pressure generated due to the burning of a propellant, thereby permitting the egress of the stored inflation gas, the central portion or second burst disk being ruptured by the continued build up of pressure due to the burning propellant material whereupon after the rupturing of the second burst disk the heated products of combustion resulting from the burning propellant material flow through the sliding piston to increase the temperature of the stored inflation gas prior to its exit from the inflator.

2. The inflator as defined in claim 1 wherein the pressure means comprises a cylindrical sleeve, a first end cap secured at one end thereof and a second end cap secured at another end thereof, the second end cap being of generally cylindrical shape and including a narrowed portion extending into the sleeve, the narrowed portion defining a first opening, the first burst disk being secured to the narrow portion to close the first opening, the second end cap further including at least one orifice opening through which gases escape upon the puncturing of the first burst disk.

3. The inflator as defined in claim 1 wherein the first end cap supports a pressure sensor positioned interior to the pressure means.

4. The inflator as defined in claim 1 wherein a propellant housing is positioned within and generally spaced from the interior of the second end cap, the housing including a second opening facing the first burst disk, a hollow sleeve member is secured to the housing and extends through the second opening, the sliding piston is received within the sleeve member and wherein the outer portion of the shear disk is secured to the sleeve member.

5. The inflator as defined in claim 4 wherein the shear disk includes a stress riser between the outer portion and central portion, the stress riser providing a weakened region along which the central portion separates from the outer portion.

6. The inflator as defined in claim 5 wherein the stress riser comprises a circular groove.

7. The inflator as defined in claim 4 wherein the shear disk includes a second stress riser located within the central portion defining a weakened region therein, the central portion or second burst disk opening along this region at a determinable pressure to allow the products of combustion of the burning propellant to mix with the stored inflation gas.

8. The inflator as defined in claim 7 wherein the second stress riser comprises two intersecting grooves.

9. The inflator as defined in claim 1 wherein the piston and sleeve member cooperate to provide an interference fit therebetween when the piston has moved to its burst disk piercing position, thereby preventing the piston from being moved backwardly by the escaping inflation gas.

10. The inflator as defined in claim 9 wherein the piston includes a groove capable of being trapped by the sleeve member after the piston has moved forwardly thereby further locking the piston is its forward position.

11. The inflator as defined in claim 1 wherein the propellant material is secured within the propellant housing spaced from the sliding piston, an initiator means responsive to a control signal indicative of a crash situation, for generating heat to cause the propellant to burn, bias means interposing the initiator means and propellant material for preloading the propellant material to prevent movement of same.

12. The inflator as defined in claim 11 wherein the bias means comprises a screen in contact with the propellant material the screen functions as a means of uniformly distributing the heat generated by the initiator means to the propellant.

13. The inflator as defined in claim 12 wherein the bias means further includes a resilient material which preloads the screen onto the propellant material.

14. The inflator as defined in claim 1 wherein a diffuser is positioned about the inflator to distribute gas of inflation to an air bag, such air bag mounted about the diffuser.

15. The inflator as defined in claim 11 wherein the initiator means includes an initiator housing secured to the propellant housing and a squib or initiator for initiating the burning of the propellant material, and ignition enhancing means positioned between the squib and the propellant material for increasing the heat supplied to the propellant material.

16. The inflator as defined in claim 13 wherein the resilient material is silicone.

17. An inflator comprising:

pressure means for storing a quantity of inflation gas under pressure comprising a first burst disk for preventing egress of the inflation gas;

a sliding piston including at one end thereof first means for puncturing the first burst disk;

a shear disk having a stationary outer portion and a central or inner portion, the central portion secured to one end of the piston opposite the first means and the central portion capable of separating from the outer portion and moving with the piston, the central portion functioning as a second burst disk, the stationary outer portion having a burst strength which is less than the central or inner portion;

propellant material for producing gaseous combustion products when burned;

the piston being propelled into the first burst disk after the central portion of the shear disk separates from the outer portion in response to the build up of pressure generated due to the burning of a propellant, thereby permitting the egress of the stored inflation gas from the pressure means, the central portion or second burst disk being ruptured by the continued build up of pressure due to the burning propellant material whereupon after the rupturing of the second burst disk the heated products of combustion resulting from the burning propellant material flow past the sliding piston into the pressure means to increase the temperature of the stored inflation gas prior to its exit from the inflator.

18. The inflator as defined in claim 17 wherein the sliding piston is hollow and the heated products of combustion flow through the sliding piston into the pressure means.

* * * * *